(12) United States Patent
Hassan et al.

(10) Patent No.: US 12,316,708 B2
(45) Date of Patent: May 27, 2025

(54) SERVER INITIATED COMMUNICATION SESSION JOIN AFTER ENDPOINT STATUS CHECK FAILURE

(71) Applicant: Microsoft Technology Licensing, LLC, Redmond, WA (US)

(72) Inventors: Amer Aref Hassan, Kirkland, WA (US); Mahendra D. Sekaran, Sammamish, WA (US); Scott Edward Van Vliet, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/677,441

(22) Filed: May 29, 2024

(65) Prior Publication Data

US 2024/0314210 A1    Sep. 19, 2024

Related U.S. Application Data

(63) Continuation of application No. 18/037,654, filed as application No. PCT/US2021/057318 on Oct. 29, 2021, now Pat. No. 12,047,461.

(30) Foreign Application Priority Data

Dec. 11, 2020    (LU) .................................. LU102277

(51) Int. Cl.
*H04L 67/148*    (2022.01)
*H04L 67/141*    (2022.01)

(52) U.S. Cl.
CPC .......... *H04L 67/148* (2013.01); *H04L 67/141* (2013.01)

(58) Field of Classification Search
CPC ........................... H04L 67/148; H04L 67/141
See application file for complete search history.

(56) References Cited

U.S. PATENT DOCUMENTS

| 2002/0076025 A1* | 6/2002 | Liversidge | .............. | H04L 51/04 |
| | | | | 709/204 |
| 2014/0237123 A1* | 8/2014 | Dave | ..................... | H04M 19/04 |
| | | | | 709/227 |

(Continued)

OTHER PUBLICATIONS

Extended European Search Report received for EP Application No. 24193028.8, mailed on Dec. 11, 2024, 11 pages.

(Continued)

*Primary Examiner* — Michael A Keller
*Assistant Examiner* — Thao D Duong
(74) *Attorney, Agent, or Firm* — Schwegman Lundberg & Woessner, P.A.

(57) ABSTRACT

Disclosed in some examples are methods, systems, and machine-readable mediums which automatically initiate a connection to a network-based communication session using a second communication application responsive to the communication service detecting that the user is unable to join the network-based communication session using a first communication application. The first and second communication applications may be on a same or different computing device. For example, if a user's desktop device is unavailable or experiencing connection issues, then the communication server may automatically request that a communication application on a mobile phone of the user join the network-based communication session.

20 Claims, 8 Drawing Sheets

(56) References Cited

U.S. PATENT DOCUMENTS

| | | | | |
|---|---|---|---|---|
| 2018/0332131 A1* | 11/2018 | Papakipos | ............... | G01S 19/01 |
| 2019/0296969 A1* | 9/2019 | Zimny | ................. | H04W 12/03 |
| 2019/0392395 A1* | 12/2019 | Valliani | ................ | G06Q 10/109 |
| 2021/0390144 A1* | 12/2021 | B M S | ................ | H04L 65/4053 |
| 2022/0053073 A1* | 2/2022 | Appel | ................ | H04N 21/4122 |

OTHER PUBLICATIONS

Communication pursuant to Rules 70(2) and 70a(2) received in European Application No. 24193028.8, mailed on Jan. 13, 2025, 2 Page.

\* cited by examiner

SERVER INITIATED COMMUNICATION SESSION JOIN AFTER ENDPOINT STATUS CHECK FAILURE

CLAIM FOR PRIORITY

This application is a continuation of U.S. application Ser. No. 18/037,654, filed Mar. 18, 2023, which is National Phase of International Application No. PCT/US2021/057318, filed Oct. 29, 2021, and claims the benefit of priority of Luxembourg Patent Application No. LU102277, filed Dec. 11, 2020, which applications are hereby incorporated by reference in their entireties.

TECHNICAL FIELD

Embodiments pertain to network-based communication sessions. Some embodiments relate to sending, by a communication server providing a network-based communication session, a connection request to a second communication application registered to a user when a first communication application registered to the user is unavailable to join the network-based communication session.

BACKGROUND

Network-based communication sessions provided by a network-based communication service allow two or more participants to interact with each other using a variety of different media such as audio, video, applications, files, the contents of a computer screen, and the like. These sessions may feature real-time or near real-time communications using these media. Example communication sessions include online meetings, Voice over Internet Protocol (VOIP) phone calls, chat sessions, and the like. These sessions allow users to interact remotely in ways that are sometimes more effective than a face-to-face communication.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
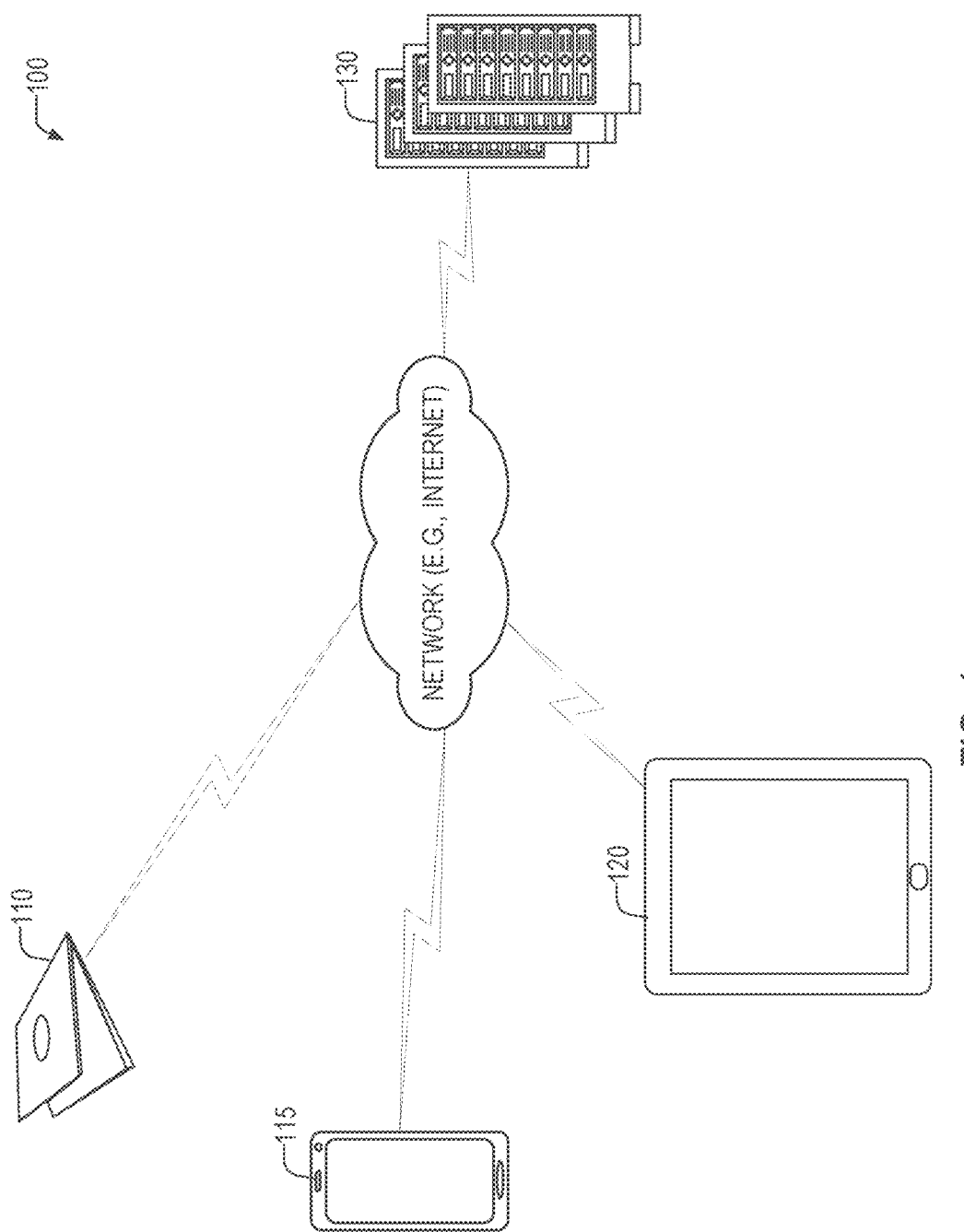
FIG. 1 illustrates a diagram of a system of a server-initiated communication session join after endpoint failure according to some examples of the present disclosure.

As technology has advanced, computing devices have gotten cheaper, smaller, and more powerful. As a result, computing devices have assumed a greater role in the everyday lives of people in society. The combined increase in importance of computing devices to users as well as the reduction in costs of those devices have allowed users to have multiple computing devices at their disposal. For example, throughout the course of a day, users may use one or more different desktop computing devices, smartphone computing devices, laptop computing devices, wearable computing devices, and other devices.

Users may install a communication application that allows the user to participate in a network-based communication session on more than one of these computing devices. After installation of each communication application, the communication application may be registered with the communication service. As part of the registration process the communication service may record information about the application, the device on which the application is executing, and the account to which the application is authenticated. In this manner, the communication service may build a profile of devices and applications that the user has used in the past to connect to the communication service. In addition, a user may register devices with the network-based communication service through one or more graphical user interfaces (GUIs)—such as registering a phone number of a user's mobile device (e.g., a smartphone, a VoIP number, or the like).

Certain software problems, network connectivity problems, or user error may cause a user difficulty in connecting to a scheduled network-based communication session. This may cause frustration for the user and in some instances may cause the user to be late to the network-based communication session. Disclosed in some examples are methods, systems, and machine-readable mediums which automatically initiate a connection to a network-based communication session using a second communication application responsive to the communication service detecting that the user is unable to join the network-based communication session using a first communication application. The first and second communication applications may be on a same or different computing device. For example, if a user's desktop device is unavailable or experiencing connection issues, then the communication server may automatically request that a communication application on a mobile phone of the user join the network-based communication session. The user may accept the connection on their mobile phone and be admitted to the communication session using their mobile phone. More generally, if the communication server providing the communication service, detects that a first registered communication application that the communication service predicts the user will attempt to use to join a scheduled meeting is not available, the communication server may try to initiate a connection to a second registered communication application.

In this manner, the present disclosure solves a technical problem with a technical solution. In particular, the present disclosure includes automatically identifying technical problems preventing a user from joining a network-based communication session and then, in response to identifying a technical issue, sending a join message to a different communication application of the user. This allows the user to quickly join the network-based communication session. In addition, the present disclosure solves the technical problem of automatically determining that a user is having technical issues by using the technical solution of analyzing signals such as a lack of response to polling messages; a response to a polling message that indicates an error; or through multiple attempts to join the network-based communication session.

Furthermore, the system solves other technical problems with technical solutions; such as by using one or more signals such as connectivity data to determine which application the user will attempt to use to connect to the network-based communication session and which device the system should try in case the primary application is experiencing a technical problem. The present technical solutions improve the functioning of the computer system and the network. For example, by increasing the effectiveness of meeting join by applications; by eliminating or reducing network traffic, processor usage, and memory usage that occur as a user attempts to continuously and unsuccessfully join the network-based communication session on the first communication application; and by reducing network traffic, processor usage, memory usage, and network-based communication system resources that occur when other attendees need to wait for a user to join a meeting.

As noted, the communication service may determine the first registered communication application that it predicts that the user will use to join the scheduled meeting. The communication service may use one or more factors to determine the first registered communication application. The system may use connectivity data of the user that specifies connectivity preferences or past connectivity information such as past application usage. Connectivity data may include past unsuccessful attempts to connect to the network-based communication session using the first communication application. For example, the user may have tried already to join the communication session using an application. This application may be selected as the first application.

In some examples, the connectivity data may include preferences of the user that may specify an ordering of registered applications that the user prefers. The first registered communication application may be identified as the top ranked application according to the user's preferences. The preferences may be context specific. For example, if the user is in a particular location (as determined by a mobile device of the user), the user may have certain preferred devices. Similarly, context may include time of day, day of the week, and the like.

In some examples, the historical application usage of the user may be used to select the first registered communication application. Examples of selecting the first registered communication application using user history may include selecting the application that the user last interacted with; the application that the user uses the most; the application that the user normally uses for communication sessions; the application that the user normally uses for this communication session (e.g., for re-occurring sessions or sessions with a particular other user or set of users); the application that the user normally uses given the present context of the user; other past history of the user; or the like. The present context of the user may include the user's location, the time of day, the user's velocity, and the like. For example, the system may dynamically select an application based upon the user's habits such as based upon the application the user usually uses for a given location, time of day, velocity, and/or other information about the user. In other examples, the system may determine a user's location through a location sensor (e.g., a Global Positioning System (GPS) sensor) on their mobile device or through calendar entries, or usage data. This location information may be used to select an application. For example, if the user's location is determined to be at their home, the system may select an application that has a last known IP address that resolves to a location nearest the user's home.

In some examples, the system may limit the selections of the first registered communication application to a list of registered communication applications that are known to be executing and/or authenticated to the communication service.

In some examples only one of the above-mentioned factors may be used, but in other examples multiple ones of the above-mentioned factors may be used in combination. For example, the system may first use a last-used registered communication application unless the time of last-use was greater than a threshold time in which case the system may use a registered communication application that the user has used in the past for network-based communication sessions of a similar or a same length, with similar or the same attendees, and at a similar or same time of day. In other examples, each application may be scored according to one or more of the above factors and the application with the highest point total may be selected as the first application. Thus, an application may be given points based upon how long ago the user used the application, whether or not the last known network address of the application matches a user's location, and the like.

The second registered communication application is a communication application that is different from the first communication application and may be on a same computing device or a different computing device than the first registered communication application. The communication system may determine the second registered application in a number of ways. For example, as noted the communication system may use connectivity data of the user such as preferences of the user that may specify an ordering of registered applications that the user prefers. The second registered communication application may be the second ranked application (behind the first registered communication application) according to the user's preferences. In other examples, the system may use connectivity data such as history of the user to select the second registered communication application. Examples of selecting the second registered communication application using user history may include selecting the application from the list of registered communication applications (excluding the first communication application) that the user last interacted with; the application that the user uses the most; the application that the user normally uses for communication sessions; the application that the user normally uses for this communication session (e.g., for re-occurring sessions or sessions with a particular other user or set of users); the application that the user normally uses given the present context of the user; other past history of the user; or the like. The present context of the user may include the user's location, the time of day, the user's velocity, and the like. For example, the system may dynamically select a second communication application based upon the user's habits, such as based upon the application the user usually uses (excluding the first communication application) for a given location, time of day, velocity, and/or other information about the user. In other examples, the system may determine a user's location through a location sensor (e.g., a Global Positioning System (GPS) sensor) on their mobile device or through calendar entries, or usage data. This location information may be used to select an application. For example, if the user's location is determined to be at their home, the system may select an application that has a last known IP address that resolves to a location near the user's home.

In some examples, the system may limit the selections of the second registered communication application to a list of registered communication applications that do not include the first registered communication application and are known to be executing and/or authenticated to the communication service.

As with the selection of the first registered communication application, the selection of the second registered communication application may use only one of the above-mentioned factors, but in other examples multiple ones of the above-mentioned factors may be used. For example, the system may first use a last-used registered communication application (excluding the first communication application) unless the time of last-use was greater than a threshold time in which case the system may use a registered communication application (excluding the first communication application) that the user has used in the past for network-based communication sessions of a similar or a same length, with similar or the same attendees, and at a similar or same time of day. In other examples, each application may be scored according to one or more of the above factors and the application with the highest point total (excluding the first application) may be selected as the second application. Thus, an application may be given points based upon how long ago the user used the application, whether or not the last known network address of the application matches a user's location, and the like. The selection of the second communication application may use same, similar, or different factors than the selection of the first application.

The communication server may determine that there is a problem with the first registered application in a number of ways. For example, the user may have already tried to join the network-based communication session with the first registered communication application over a threshold number of times in a specific period of time. In other examples, the server may send one or more polling or ping messages to the first communication application. These messages may request a response from the first registered application. If the response is not received, the communication server may infer that there is a problem with the first registered application. These messages may be sent just prior to, at the time of, or just after the online communication session is scheduled to start. In still other examples, the communication service may specify that the communication applications that are authenticated and executing send status update messages with a specific periodicity. If the status messages have not been received from the first registered communication application in a threshold period of time, the communication service may infer that the first registered communication application is not functioning.

The communication server may initiate a connection to the second registered application by sending a connection request to the second registered application. This may cause the second registered application to alert the user. If the user accepts the connection request, the user may be joined to the network-based communication session using the second communication application. As previously noted, the second registered application may be on a same or a different device from the first registered application. The connection request may be a call setup request (for connecting a mobile phone to audio of the meeting); a SIP-INVITE request, any other protocol setup request; and the like. If the user does not respond to the request, the communication server may continue to try different registered communication applications (selected using the same or similar criteria as described above for the selection of the second registered application) until the user joins the network-based communication session from a communication application, the system has tried all the registered communication applications, or until the user rejects the connection request.

FIG. 1 illustrates a diagram of a system 100 of a server-initiated communication session join after endpoint failure according to some examples of the present disclosure. A communication service may be provided by one or more communication servers 130. Example communication services may include MICROSOFT TEAMS®, SKYPE®, SKYPE FOR BUSINESS®, SLACK®, AMAZON CHIME®, GOOGLE MEET®, ZOOM®, or the like. A same user may have communication applications for a same communication service installed on one or more computing devices. For example, FIG. 1 illustrates three computing devices 110, 115, and 120 which may execute one or more communication applications of the communication system and which may be registered with the communication service. The communication applications on the computing devices 110, 115, and 120 may register with the communication service by messaging the communication servers 130. In some examples, the registration may happen initially when the communication application is installed and a user is authenticated, and may be renewed or refreshed periodically.

In some examples, after registration, when a communication application on a computing device begins executing, it contacts the communication servers 130 to authenticate. The communication application periodically provides status updates that indicates that the communication application is executing and may be contacted. For example, the communication application may provide network reachability information-such as a network address to the communication servers 130. In addition, the communication application may provide user status information, such as whether the user is busy, free, unavailable, or the like. The communication server 130 may track a list of registered applications that are used by the user and stores records of status updates including the network reachability information.

At a predetermined time period relative to a scheduled network-based communication session, the communication service may determine whether a first communication application on a first device that the communication service predicts that the user will use to join the communication session. The time period relative to the scheduled network-based communication session may be before, at, or after the scheduled time of the network-based communication session. As noted, the communication service may determine the first communication application in a number of ways. For example, in FIG. 1, the communication service may determine that an application executing on computing device 120 will be used to join the communication session. For example, the computing device 120 may be executing the communication application most recently used to access the communication service.

As used herein, the communication application is any computing device application that may be used to access the communication service or features of the communication service. Communication applications include desktop applications, mobile applications, internet browsers, phone applications, and the like. Communication applications may allow users to take advantage of all forms of communication and media that are provided by the communication service, or only some forms of media. For example, a phone call application on a mobile phone that is used to make and/or receive phone calls on a mobile phone is considered herein to be a communication application.

The communication service may perform a health check to determine whether there is a problem with the first registered communication application as noted above. In some examples, the communication service may perform the health check by sending polling messages to the first registered communication application. If the first communication application does not respond within a specified time period, or responds indicating that there is a problem, the communication service may determine there is a problem. In other examples, the health check may determine there is a problem if required status update messages have not been received from the first registered communication application in over a threshold amount of time. In yet other examples, if required status update messages have not been received from the first registered communication application in over a threshold amount of time, the communication service may send polling messages and if no reply is received within a threshold amount of time, the communication service may determine there is a problem. If the communication service determines there is a problem, and if the user has not already joined the network-based communication session, the communication service may try joining the user to a second communication application-which may be on the first computing device or a second computing device.

As noted, the communication application may respond to polling messages, but may report that it is having issues joining the network-based communication session. Issues may include difficulty setting up media streams, difficulty with audio recording or playback devices, and the like. Additionally, if the user has joined and left the same network-based communication session greater than a threshold amount of time in a specified time period, the first communication application may determine that while the application cannot detect any problems, that the user perceives a problem. If the first communication application responds that it is having difficulty joining the network-based communication session, the communication service may try initiating a connection of the user to a second communication application-which may be on the first computing device or a second computing device. It should be noted that multiple attempts to join the network-based communication session may be detected at either or both of the first registered communication application or the communication service.

For example, if the first communication application is executing on computing device 120 and the computing device 120 either does not respond to the polling messages or responds that the first communication application is having difficulty connecting to the network-based communication session, the communication server 130 may send a connection request to another application registered to the user to join the network-based communication session, for example, an application executing on computing devices 110 or 115. The request may be sent to a last known network address of the application as determined based upon status updates sent by those applications. In some examples, the request may be sent to applications that are known to be executing and authenticated to the network-based communication service. In other examples, the request may be sent to any registered application. In still other examples, the request may be sent to applications that are known to be executing and authenticated first; if the applications known to be executing and authenticated do not answer, other registered applications that are not known to be executing and authenticated may be tried.

Figure 2:
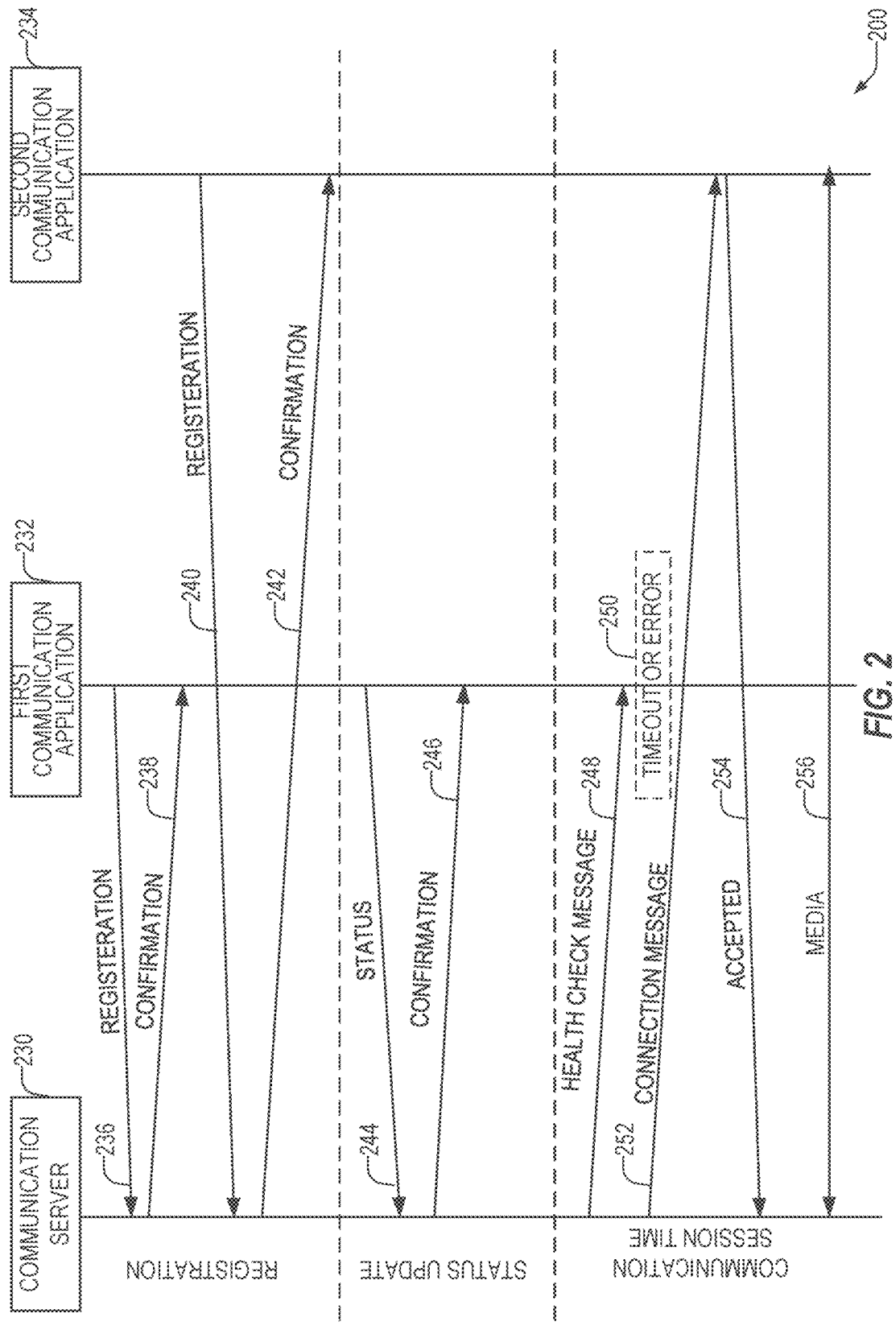
FIG. 2 illustrates a message sequence diagram of a server-initiated communication session join after endpoint failure according to some examples of the present disclosure.

FIG. 2 illustrates a message sequence diagram 200 of a server-initiated communication session join after endpoint failure according to some examples of the present disclosure. In a device registration phase, a first communication application 232 may send one or more registration messages 236 to a communication server 230 that provides a communication service or a portion of a communication service. The registration messages may register the first communication application 232 with the communication server 230. The communication server 230 may provide a confirmation message 238. Similarly, second communication application 234, sends a registration message 240 and receives a confirmation 242. During the registration phase, the communication server 230 may add the first communication application 232 and second communication application 234 to a list of applications associated with a particular user account. In some examples, the registration may happen before, with, or after user authentication.

During a status update phase, the first communication application 232 may send a status update message 244. The status update message may update a status of a user and may provide a current network address of the first communication application 232. The communication server 230 may provide a confirmation message 246. In some examples, status update messages, such as status update message 244 may be sent periodically at a defined interval from first communication application 232. In other examples, the status update messages may be sent only when a change of status in either the user or the application is detected.

Within a specified time, relative to a scheduled network-based communication session, the communication server 230 may determine that the first communication application 232 will be used to connect to a network-based communication session. This may be determined as previously described. The communication server 230 may perform a health check. For example, by sending a health check message 248. When the health check message 248 is sent, the communication server 230 may set a timer. If the timer times out or a response is sent indicating an error 250 (and the user is not currently joined to the communication session), then the communication server 230 may determine that the user may be having trouble joining the scheduled network-based communication session. As previously described, other health checks may include determining whether the user has tried to join with a particular application.

If the communication server 230 determines that the user is having trouble joining the scheduled network-based communication session, the communication server 230 may determine a second registered application, such as second communication application 234 as previously described. The communication server 230 may send a connection message 252 to the second communication application 234. The connection message 252 may be a Session Initiation Protocol (SIP) message, such as a SIP Invite message, a telephone dial out message to connect the application to an audio channel of the network-based communication session, or some other message that may initiate a connection to the network-based communication session. The second communication application 234 may display a prompt to the user to determine whether the user wishes to connect using the second communication application 234. If the user accepts, then the second communication application 234 sends an acceptance message 254. Once the communication server 230 receives the acceptance message 254, the communication server 230 may start to stream media 256 of the network-based communication session to the second communication application 234.

Figure 3:
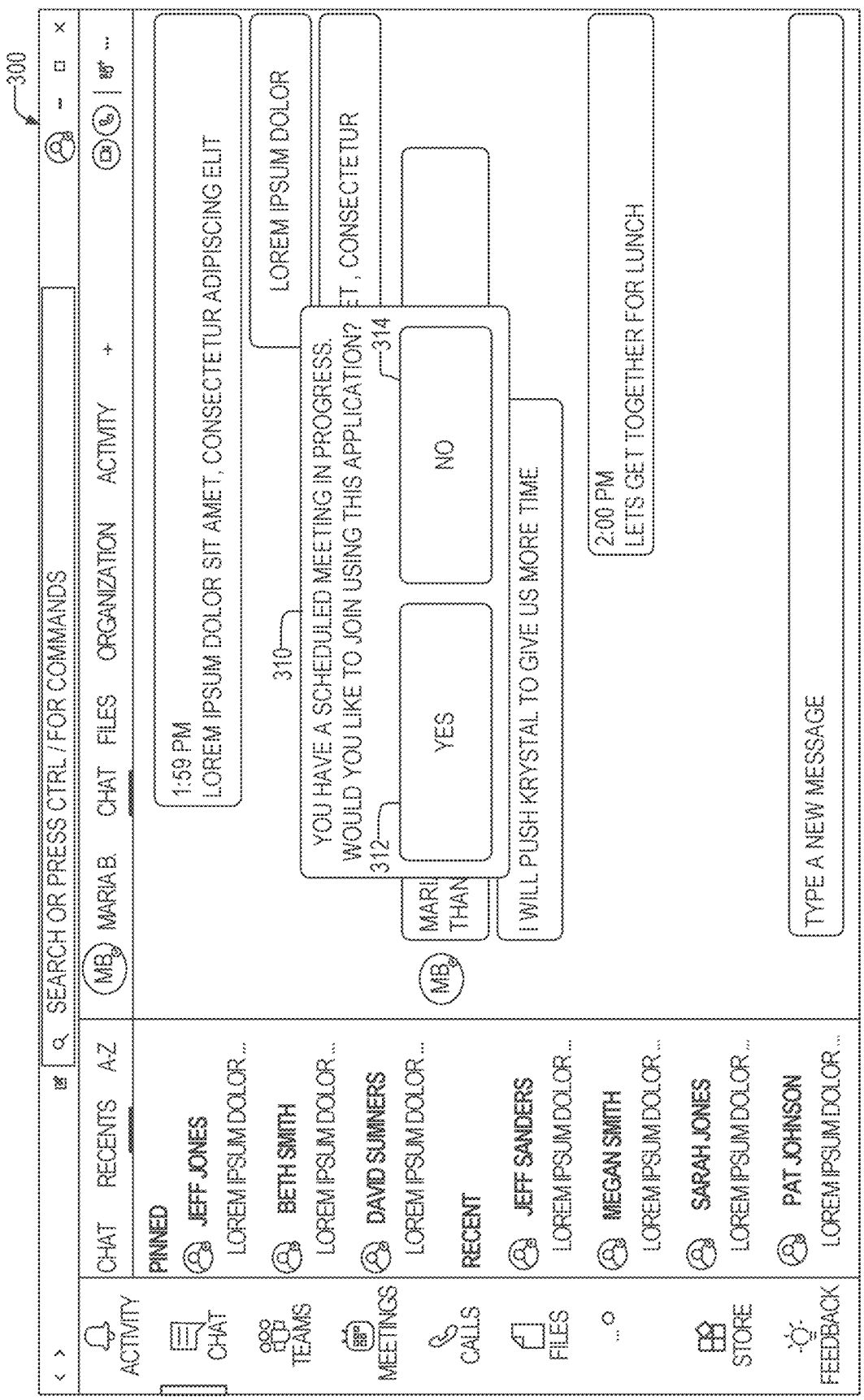
FIG. 3 illustrates a diagram of a Graphical User Interface (GUI) of a communication application.

FIG. 3 illustrates a diagram of a Graphical User Interface (GUI) 300 of a communication application. Pop-up notification 310 informs the user that a scheduled network-based communication session (in the form of an online meeting) is already in progress and asks the user if they would like to join the network-based communication session on this application. The user may accept the offer by clicking on the "Yes" button 312—at which point they are joined to the network-based communication session. As used herein, joining the network-based communication session means being authenticated with and receiving audio, video, and/or other media of the network-based communication session (depending on the media shared and the capabilities of the application). If the user selects "No" button 314, the user is not connected to the network-based communication session. If the user declines the offer, in some examples, additional applications are tried, but in other examples, an explicit decline terminates further attempts at the application and other applications.

Figure 4:
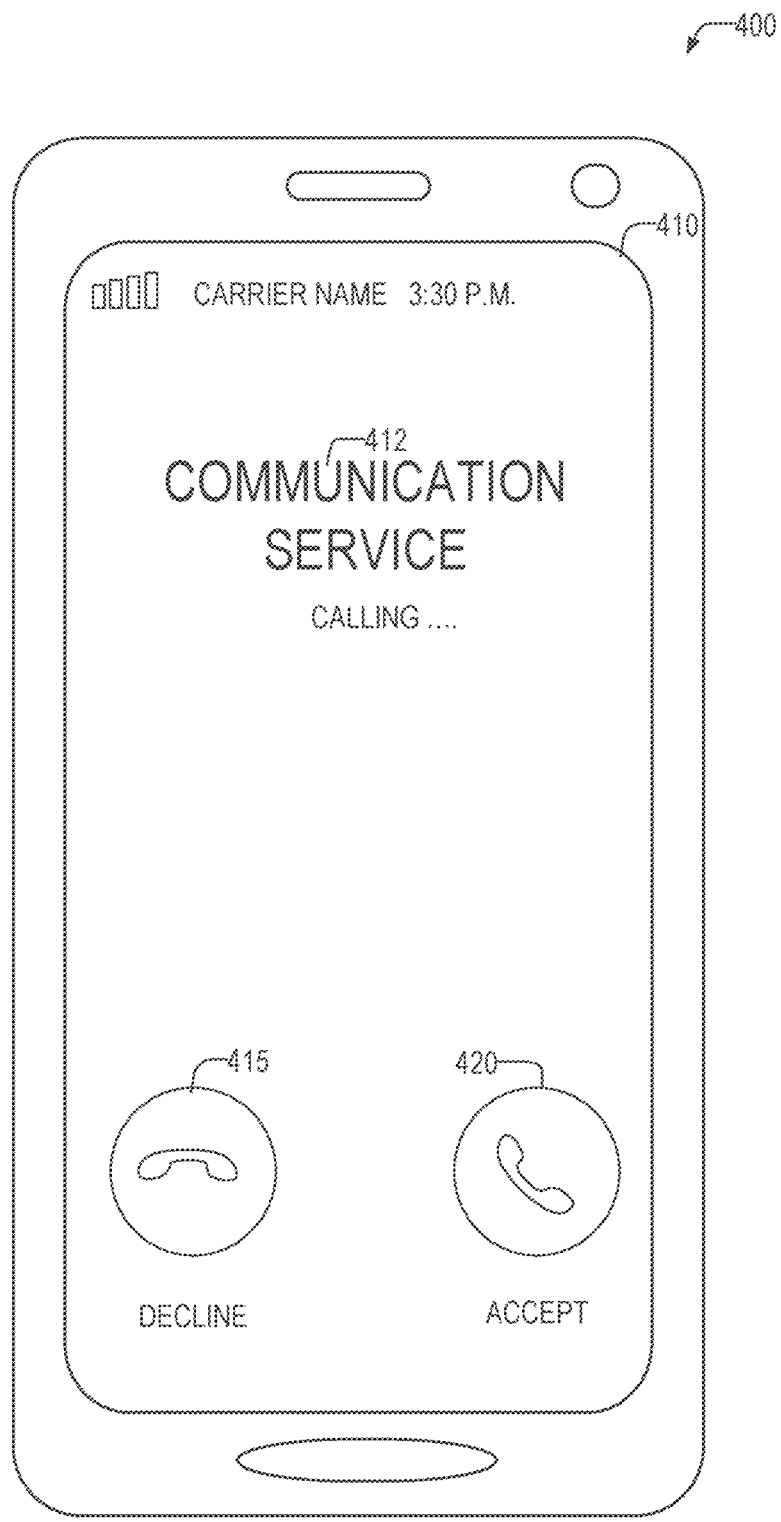
FIG. 4 illustrates a diagram of a GUI of a communication application of a mobile phone.

FIG. 4 illustrates a diagram of a GUI 410 of a communication application of a mobile phone 400. The communication application in this example is a phone application. The GUI indicates that the communication service is calling at 412. The user can accept the call by tapping, swiping, or otherwise interacting with accept button 420 or may decline by tapping, swiping, or otherwise interacting with decline button 415.

Figure 5:
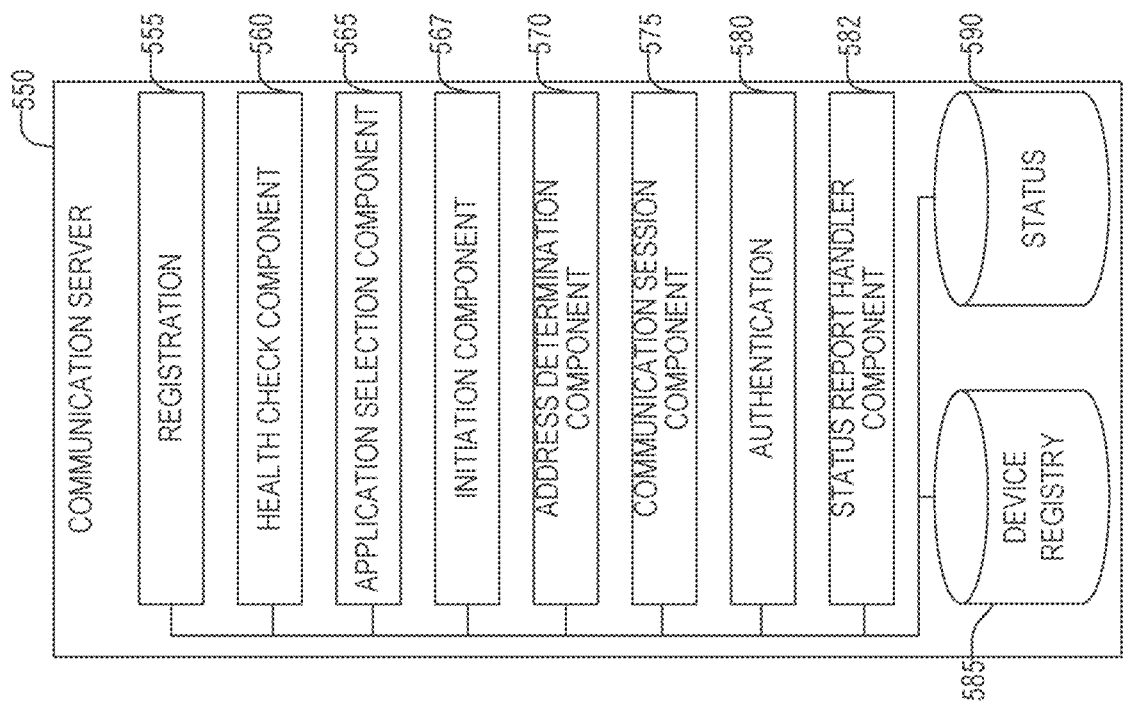
FIG. 5 illustrates logical diagrams of a communication application and a communication server according to some examples of the present disclosure.
Figure 5:
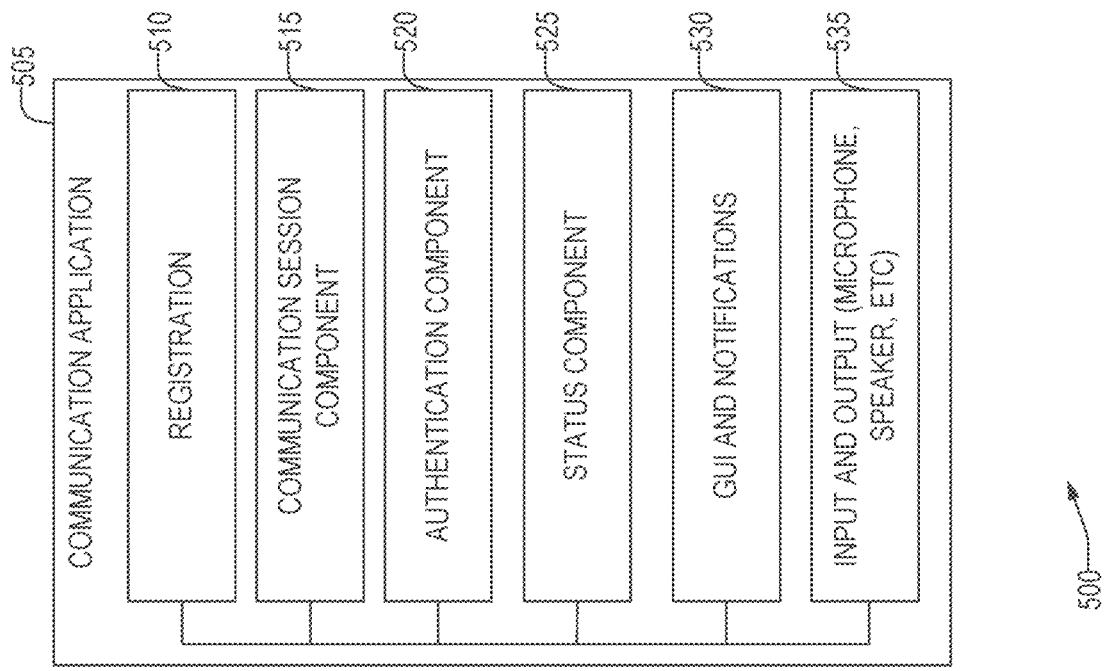

FIG. 5 illustrates logical diagrams of an example communication application 505 and an example communication server 550 according to some examples of the present disclosure. In some examples, the communication application 505 and communication server 550 may have fewer or more components than shown in FIG. 5.

Communication application 505 may include a registration component 510 which may send one or more registration messages to the communication server 550. Registration component 555 of the communication server 550 may receive these messages and record information about a device that is executing the communication application 505 in the device registry 585. This may include network addresses and other network reachability information. This may further include associating the device and the communication application 505 with a particular user that is using the communication application 505; for example, a user authenticated to the communication service provided by the communication server 550.

Authentication component 520 may authenticate a user of the communication application 505 to the communication service by sending credentials to the authentication component 580 of the communication server 550. Once authenticated, the communication server 550 may provide one or more communication services to the authenticated user based upon the level of access granted to the user. For example, the user's account may be authorized to have audio calls or audio meetings, but not authorized to use video.

Status component 525 may update the status of the communication application 505. For example, a current network address of the device executing the communication application 505, an availability status of the user (e.g., free, busy, do not disturb), and the like. Status report handler component 582 of the communication server 550 may receive the status messages from the communication application 505 and update information in the status data store 590 such as the user's availability. In some examples, the network address or other reachability information may be updated. The network address or other reachability information may be stored in either the device registry 585 or the status data store 590.

GUI and notifications component 530 may provide one or more GUIs that display an interface of the communication application 505. GUI and notifications component 530 may provide one or more GUIs that allow users to schedule and/or participate in a network-based communication session, set various options including ordering of communication application preferences, or the like. GUI and notification component 530 may provide one or more notifications, such as notifications that the communication service is trying to initiate a connection. For example, GUI and notification component 530 may provide a GUI such as shown in FIG. 3 and FIG. 4.

Communication session component 515 provides a communication session to the user via the GUI and notifications component 530. This includes displaying, playing, or otherwise presenting media of the communication session as well as capturing and sending media provided by the user of the communication application. Media may be captured, played, or presented through input and output component 535 which may interface with a microphone, speaker, and the like to capture and/or play out media. Communication session component 515 and 575 may implement and communicate with one another using one or more protocols, such as Real-Time Transfer Protocol (RTP), Transmission Control Protocol (TCP), Session Initiation Protocol (SIP), and the like.

Communication server 550 may provide functionality of a communication service. For one or more particular participants of a network-based communication session, the application selection component 565 may determine a first communication application; the first communication application determined by the system to be likely to be used by the user to connect to the network-based communication session.

As noted previously, this determination may use user connectivity data such as user preference data. User preference data may include a user entered ranking of applications entered into a GUI provided by GUI and notifications component 530 of a communication application 505. These preferences may then be provided to the communication service and stored, such as in the device registry 585 or the status data store 590. In these examples, the selection of the first communication application may be the top-ranked communication application. In some examples, the selection may be the top-ranked application that is authenticated as the user with the communication service. In still other examples, the selection may be the top-ranked application that is authenticated as the user with the communication service and has recently sent a status update.

In other examples, the system may select the first communication application based upon repeated successful (from the communication service's point of view) or unsuccessful attempts to join the network-based communication session. For example, the communication session component 575 may monitor communication applications and their status. If a same application attempts unsuccessfully to join the network-based communication session, the application used may be selected as the first communication application.

In other examples, the connectivity data may include historical activity of the user that may be used to select the first registered communication application. Examples include selecting the application that the user last interacted with. For example, if the user last used a specific registered application to join another network-based communication session, then that application may be selected. Other activity may be considered such as chat activity, activity with the GUI of the network-based communication application (e.g., as monitored by the GUI and notifications component 530 that is sent to the communication service), network-based communication scheduling activity, calendar inquiries, status updates, and the like.

In other examples, the first communication application may be the application that the user uses the most. In yet additional examples, the system may select the application that the user normally uses for communication sessions; the application that the user normally uses for this communication session (e.g., for re-occurring sessions); the application that the user normally uses given the present context of the user; other past history of the user; or the like. The present context of the user may include the user's location, the time of day, the user's velocity, and the like. In some examples, the system may limit the selections of the first registered communication application to a list of registered communication applications that are known to be executing and/or authenticated to the communication service.

In some examples, one or more of the above items of connectivity data is used to select the first communication application may be used as input to a machine-learned model that may predict the application. This is described more in detail in the discussion of FIG. 6.

One the first communication application is selected, then the address determination component 570 may determine a network address of the first communication application. For example, it may determine an Internet Protocol (IP) address of a device on which the first communication application is executing. The network address may be observed from one or more status updates sent by the application.

Health check component 560 may determine if the first communication application is executing and in proper working order by sending one or more polling messages to the first communication application. Once the polling message is sent, the health check component 560 may set a timer of a specified duration. If a response is received before the timer expires, the health check component 560 may determine that the first communication application is healthy and not experiencing any issues. In some examples, even if the application is healthy, the initiation component 567 may send a connection request to the first communication application within a prespecified time of the meeting start if the user has not already joined. In some examples, the application may respond to the polling message by indicating that the application is having issues. For example, the user may have tried to connect with the network-based communication session and had issues. For example, by repeatedly joining and leaving the network-based communication session a threshold number of times in a specific time period. In other examples, the response may indicate problems with audio/visual devices of the user-such as problems with the speaker, microphone, or other device. The response may also indicate problems sending or receiving packets, synchronizing with the communication server, or the like.

If the polling messages time out or if a response indicates an issue, then the status check component may have the application selection component select a second registered application of the user that is different than the first registered application of the user. The selection may use the same or different factors than used to select the first communication application. As already noted, health check component 560 may, instead of, or in addition to using polling messages determine that the user has already tried unsuccessfully to join the network-based communication session.

The initiation component 567 may send a connection request to the second communication application to the network-based communication session. If the user accepts, the second communication application may be joined to the network-based communication session. The second communication application may be joined by admitting the application to the network-based communication session which results in the delivery of media of the network-based communication session to the second communication application and receipt of media from the second communication application and delivery to other computing devices that are part of the network-based communication session.

As noted, this process may be performed for a single participant, multiple participants, or all participants of a network-based communication session. As also noted, if the second communication application does not join, the system may select a third application and send a connection request to the third application, and so on.

Figure 6:
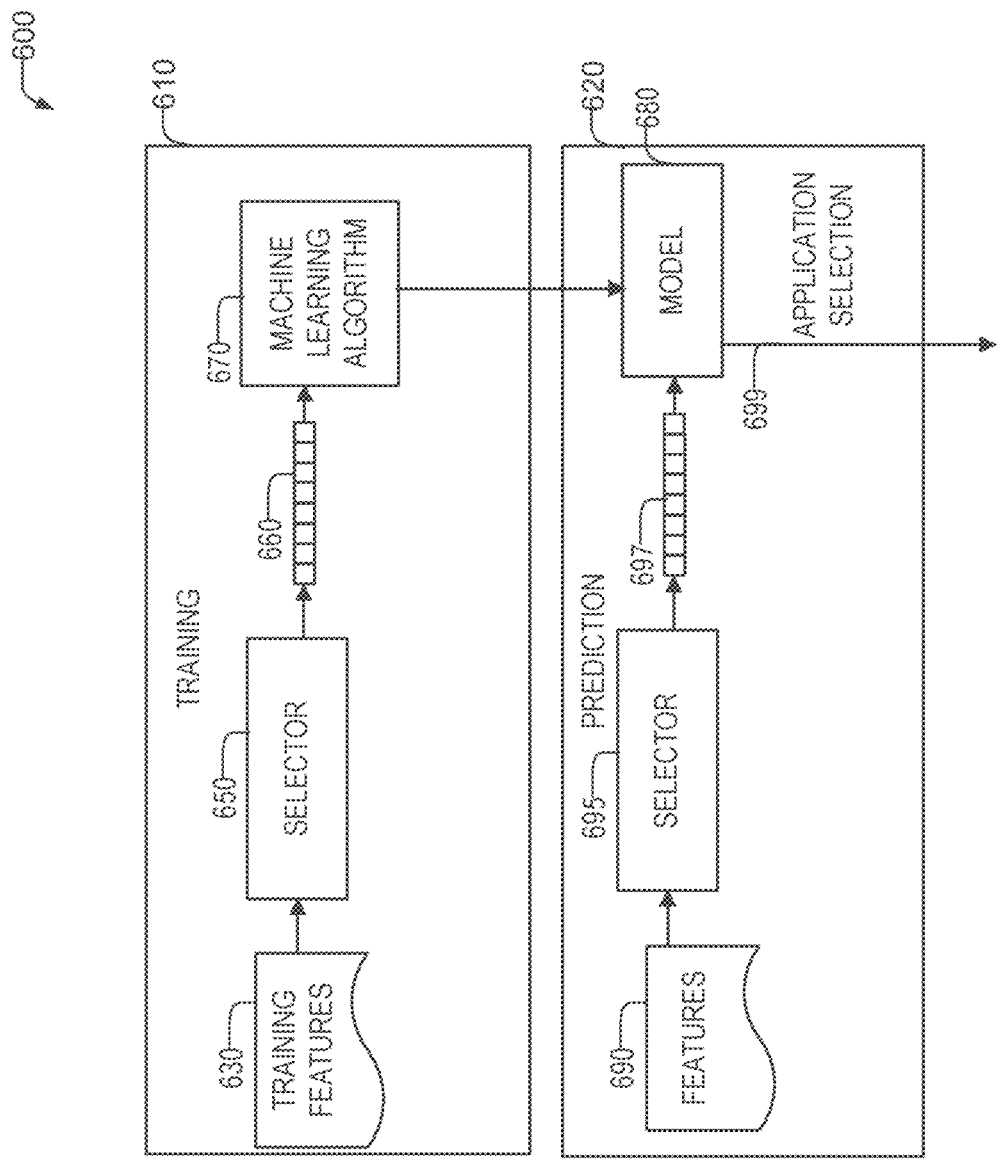
FIG. 6 shows an example machine learning component according to some examples of the present disclosure.

FIG. 6 shows an example machine learning module 600 according to some examples of the present disclosure. The machine learning module 600 may be implemented in whole or in part by one or more computing devices. In some examples, the training module 610 may be implemented by a different device than the prediction module 620. In these examples, the model 680 may be created on a first machine and then sent to a second machine. For example, one or more of the training module and prediction module 620 may be implemented as part of the application selection component 565 to select a registered application that the user is likely to use to join a network-based communication session and/or to select a second communication application to send a connection request to.

Machine learning component 600 utilizes a training component 610 and a prediction component 620. Training component 610 inputs training data 630 into selector component 650. The training data 630 may include user connectivity data, such as historical application selections of the user, usage history of the user, application rankings of the user, context of the user when the user selected a particular application, and the like. The present context of the user may include the user's location, the time of day, the user's velocity, and the like.

The training data 630 may be labeled with the chosen application that the user used given the context. In other examples, the training data may not be labeled, and the model may be trained using feedback data-such as through a reinforcement learning method. The feedback data may be an acceptance rate by the user of a connection request sent by the network-based communication service. In some examples, the training data (and the resultant model) may be per-user—that is only the user's connectivity data is used to build the model. In other examples, a group of communication service users' connectivity data may be used.

Selector component 650 converts and/or selects training vector 660 from the training data 630. For example, the selector component 650 may filter, select, or otherwise convert the training data. For example, the selector component 650 may apply one or more feature selection algorithms to find features in the training data. The selected data may fill training vector 660 and comprises a set of the training data that is determined to be predictive of the application the user will select to join a network-based communication session. Information chosen for inclusion in the training vector 660 may be all the training data 630 or in some examples, may be a subset of all the training data 630. The training vector 660 may be utilized (along with any applicable labels) by the machine learning algorithm 670 to produce a model 680. In some examples, other data structures other than vectors may be used. The machine learning algorithm 670 may learn one or more layers of a model. Example layers may include convolutional layers, dropout layers, pooling/up sampling layers, SoftMax layers, and the like. Example models may be a neural network, where each layer is comprised of a plurality of neurons that take a plurality of inputs, weight the inputs, input the weighted inputs into an activation function to produce an output which may then be sent to another layer. Example activation functions may include a Rectified Linear Unit (ReLu), and the like. Layers of the model may be fully or partially connected. In other examples, models may be a decision tree, decision stump, Bayesian network, support vector machine, logistic regression, and the like.

In the prediction component 620, features 690 are input to the selector component 695. Features 690 may be or include current connectivity data of the user and/or a current context of the user. Selector component 695 may operate the same, or differently than selector component 650. In some examples, selector components 650 and 695 are the same components or different instances of the same component. Selector component 695 produces vector 697, which is input into the model 680 to produce an application selection 699. For example, the weightings and/or network structure learned by the training component 610 may be executed on the vector 697 by applying vector 697 to a first layer of the model 680 to produce inputs to a second layer of the model 680, and so on until the encoding is output. As previously noted, other data structures may be used other than a vector (e.g., a matrix).

The training component 610 may operate in an offline manner to train the model 680. The prediction component 620, however, may be designed to operate in an online manner. It should be noted that the model 680 may be periodically updated via additional training and/or user feedback. For example, additional training data 630 may be collected as users accept or decline requests to join (for second communication application selections) or as users join network-based communication sessions with applications that differ from the selection of the first communication application that the system predicts the user will attempt to join from.

The machine learning algorithm 670 may be selected from among many different potential supervised or unsupervised machine learning algorithms. Examples of learning algorithms include artificial neural networks, convolutional neural networks, Bayesian networks, instance-based learning, support vector machines, decision trees (e.g., Iterative Dichotomiser 3, C4.5, Classification and Regression Tree (CART), Chi-squared Automatic Interaction Detector (CHAID), and the like), random forests, linear classifiers, quadratic classifiers, k-nearest neighbor, linear regression, logistic regression, a region based CNN, a full CNN (for semantic segmentation), a mask R-CNN algorithm for instance segmentation, and hidden Markov models. Examples of unsupervised learning algorithms include expectation-maximization algorithms, vector quantization, and information bottleneck method.

Figure 7:
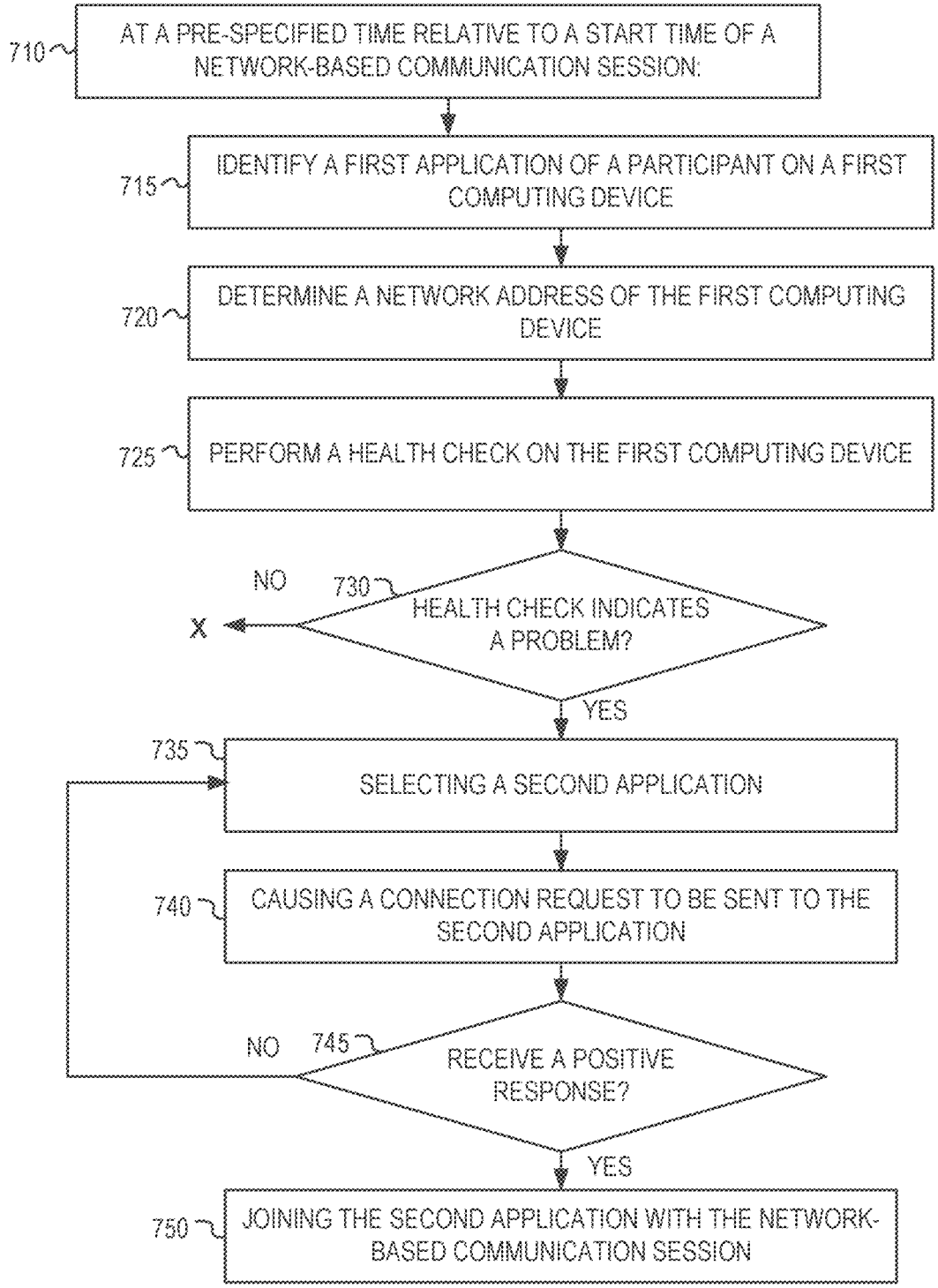
FIG. 7 illustrates a flowchart of method of a server-initiated communication session join after endpoint status check failure performed by a communication server according to some examples of the present disclosure.

FIG. 7 illustrates a flowchart of method 700 of a server-initiated communication session join after endpoint status check failure performed by a communication server according to some examples of the present disclosure. At operation 710, the system determines that a current time is a pre-specified time relative to a start time of a network-based communication session. At that time, the remaining operations of FIG. 7 are performed. At operation 715, the system may identify a first communication application of a participant that is executing on a first computing device. In some examples, this device may be simply the last application that the user used, the last application that sent a status update, and the like. In other examples, this may be a top ranked application in a list of prioritized applications or may be based upon historical data or other connectivity data of the user as previously described.

At operation 720 the system may determine a network address of the first computing device. For example, determining an Internet Protocol (IP) address from status update messages or registration messages sent by the first communication application on the first device to the network-based communication service. At operation 725, the system may perform a health check on the first computing device. For example, the server may send polling packets to the first computing device. If the first communication application on the first computing device receives a polling packet, the first communication application on the first computing device sends a response packet. If the server receives a response packet and the response packet indicates that the first communication application is ok, then, at operation 730, the health check does not indicate a problem and the flow ends. If the server does not receive a response after a timeout period has ended, or if the server receives a response that indicates a problem in the response (e.g., a response code in the response packet), then the health check indicates a problem at operation 730. Other health checks may be possible as previously discussed.

At operation 735, if the health check indicates a problem, a second communication application may be selected. The second communication application may be a registered communication application of the user that is not the first communication application. The second communication application may be selected as previously described—e.g., using connectivity data of the user.

At operation 740, the system may send a connection request to the second communication application. The request is a connection request to join the network-based communication session using the second communication application. The connection request may be a phone call, a SIP INVITE request, or some other message. The second communication application may be on the first or a second computing device. The second communication application may be an integral function of the computing device, such as a phone call functionality. For example, the server may call the first or second device to connect them to the audio of the network-based communication session. The application may be an application on the first or second device that provides phone functionality (which may be provided by a combination of hardware and/or software). The request may cause the second communication application to notify the user. At operation 745, a determination is made as to whether the user accepts the request. For example, by taking the incoming phone call, by clicking on a button to accept the request, or the like. If the user does not accept, then flow may go back to operation 735 where a different application may be tried. Otherwise flow proceeds to operation 750 where the second communication application is joined with the network-based communication session. When the second communication application is joined, media packets, such as audio, video, or both may be sent to the second communication application for display and/or playout to the user.

Figure 8:
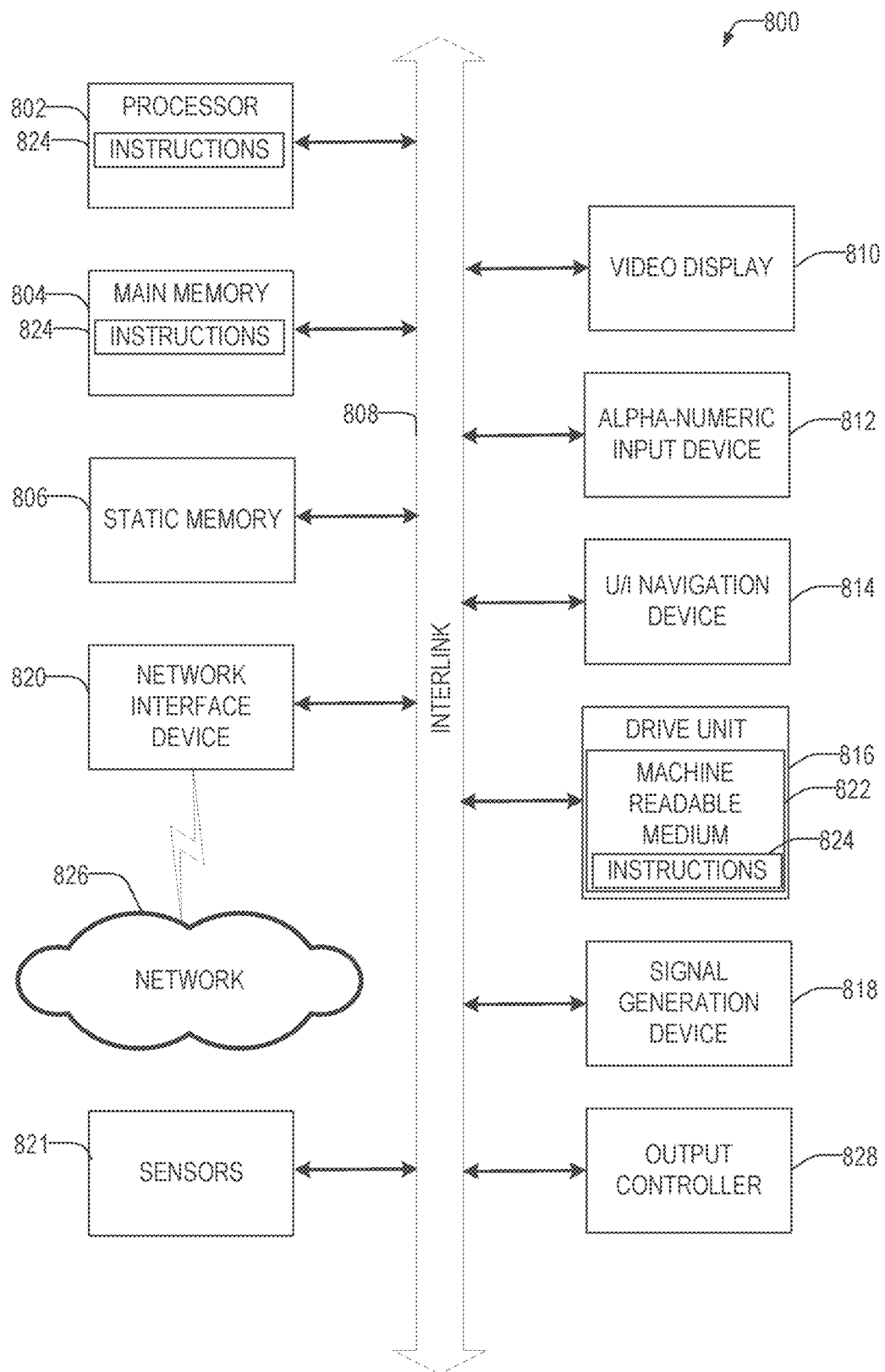
FIG. 8 illustrates a block diagram of an example machine upon which any one or more of the techniques (e.g., methodologies) discussed herein may implemented.

FIG. 8 illustrates a block diagram of an example machine 800 upon which any one or more of the techniques (e.g., methodologies) discussed herein may perform. In alternative embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in peer-to-peer (P2P) (or other distributed) network environment. The machine 800 may be a computing device that executes a communication application such as computing devices 110, 115, 120, 410; a device providing a communication service, such as communication server 130, 230, 550. Machine 800 may implement or provide one or more of first communication application 232, second communication application 234, GUI 300, the GUI shown in FIG. 4, one or more of the components shown in FIG. 5, training module 610, prediction module 620, or method 700. Machine 800 may be in the form of a personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms (hereinafter "modules"). Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 800 may include a hardware processor 802 (e.g., a central processing unit (CPU), a graphics processing unit (GPU), a hardware processor core, or any combination thereof), a main memory 804 and a static memory 806, some or all of which may communicate with each other via an interlink (e.g., bus) 808. The machine 800 may further include a display unit 810, an alphanumeric input device 812 (e.g., a keyboard), and a user interface (UI) navigation device 814 (e.g., a mouse). In an example, the display unit 810, input device 812 and UI navigation device 814 may be a touch screen display. The machine 800 may additionally include a storage device (e.g., drive unit) 816, a signal generation device 818 (e.g., a speaker), a network interface device 820, and one or more sensors 821, such as a global positioning system (GPS) sensor, compass, accelerometer, or other sensor. The machine 800 may include an output controller 828, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 816 may include a machine readable medium 822 on which is stored one or more sets of data structures or instructions 824 (e.g., software) embodying or utilized by any one or more of the techniques or functions described herein. The instructions 824 may also reside, completely or at least partially, within the main memory 804, within static memory 806, or within the hardware processor 802 during execution thereof by the machine 800. In an example, one or any combination of the hardware processor 802, the main memory 804, the static memory 806, or the storage device 816 may constitute machine readable media.

While the machine readable medium 822 is illustrated as a single medium, the term "machine readable medium" may include a single medium or multiple media (e.g., a centralized or distributed database, and/or associated caches and servers) configured to store the one or more instructions 824.

The term "machine readable medium" may include any medium that is capable of storing, encoding, or carrying instructions for execution by the machine 800 and that cause the machine 800 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 824 may further be transmitted or received over a communications network 826 using a transmission medium via the network interface device 820. The Machine 800 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 820 may include one or more physical jacks (e.g., Ethernet, coaxial, or phone jacks) or one or more antennas to connect to the communications network 826. In an example, the network interface device 820 may include a plurality of antennas to wirelessly communicate using at least one of single-input multiple-output (SIMO), multiple-input multiple-output (MIMO), or multiple-input single-output (MISO) techniques. In some examples, the network interface device 820 may wirelessly communicate using Multiple User MIMO techniques.

OTHER NOTES AND EXAMPLES

Example 1 is a computing device providing a communication service, the computing device comprising: a processor; a memory, the memory storing instructions, which when executed by the processor, cause the computing device to perform operations comprising: at a pre specified time relative to a start time of a network-based communication session, automatically, at the computing device of the communication service hosting the network-based communication session: identifying a first communication application from a plurality of registered communication applications of a participant, the first communication application executing on a first computing device of the participant; determining a network address of the first computing device based upon a previously received packet received from the first computing device; sending a polling packet to the first communication application on the first computing device, the polling packet requesting a response packet and addressed to the network address of the first computing device; determining that no response packet has been received from the first communication application for the polling packet after a threshold amount of time has passed since sending the polling packet; responsive to determining that no response packet has been received: selecting a second communication application from the plurality of registered applications using connectivity data of the participant; causing a connection request to be sent to the second communication application; receiving a connection confirmation from the second communication application; and responsive to receiving the connection confirmation, joining the second communication application with the network-based communication session by sending media packets of the network-based communication session to the second communication application.

In Example 2, the subject matter of Example 1 includes, wherein the second communication application is executing on the first computing device.

In Example 3, the subject matter of Examples 1-2 includes, wherein the second communication application is executing on a second computing device, and wherein the operations of sending the connection request to the second communication application comprises determining a network address of the second computing device based upon a previously received packet from the second computing device.

In Example 4, the subject matter of Examples 1-3 includes, wherein the previously received packet is sent by the first computing device as part of an authentication procedure or as part of a status update procedure.

In Example 5, the subject matter of Examples 1-4 includes, wherein the second communication application is a telephone application on a mobile phone that provides telephone communication functionality, and the connection request is a phone call.

In Example 6, the subject matter of Examples 1-5 includes, wherein the operations identifying the first communication application from a plurality of registered applications of a participant comprises providing connectivity data and context data of the participant as input to a machine learned model, the machine learned model previously trained using historical connectivity data of the participant, historical context data of the participant, and an identification of applications used by the participant for previous communication requests.

In Example 7, the subject matter of Examples 1-6 includes, wherein the operations of selecting the second communication application from the plurality of registered applications comprises providing connectivity data and context data of the participant as input to a machine learned model, the machine learned model previously trained using historical connectivity data of the participant, historical context data of the participant, and an identification of applications used by the participant for previous communication requests.

In Example 8, the subject matter of Examples 1-7 includes, wherein the connectivity data comprises an ordered ranking of application preferences of the participant and wherein the operations of identifying the first communication application comprises selecting a top ranking application and wherein the operations of selecting the second communication application comprises selecting a second ranking application.

In Example 9, the subject matter of Examples 1-8 includes, wherein the operations of identifying the first communication application from a plurality of registered applications of a participant comprises selecting the first communication application based upon connectivity data for the participant for joining the network-based communication session.

Example 10 is a method for connecting a user to a network-based communication session, the method comprising: at a pre specified time relative to a start time of a network-based communication session, automatically, at a computing device of a communication service hosting the network-based communication session: identifying a first communication application from a plurality of registered communication applications of a participant, the first communication application executing on a first computing device of the participant; determining a network address of the first computing device based upon a previously received packet received from the first computing device; sending a polling packet to the first communication application on the first computing device, the polling packet requesting a response packet and addressed to the network address of the first computing device; determining that no response packet has been received from the first communication application for the polling packet after a threshold amount of time has passed since sending the polling packet; responsive to determining that no response packet has been received: selecting a second communication application from the plurality of registered applications using connectivity data of the participant; causing a connection request to be sent to the second communication application; receiving a connection confirmation from the second communication application;

and responsive to receiving the connection confirmation, joining the second communication application with the network-based communication session by sending media packets of the network-based communication session to the second communication application.

In Example 11, the subject matter of Example 10 includes, wherein the second communication application is executing on the first computing device.

In Example 12, the subject matter of Examples 10-11 includes, wherein the second communication application is executing on a second computing device, and wherein sending the connection request to the second communication application comprises determining a network address of the second computing device based upon a previously received packet from the second computing device.

In Example 13, the subject matter of Examples 10-12 includes, wherein the previously received packet is sent by the first computing device as part of an authentication procedure or as part of a status update procedure.

In Example 14, the subject matter of Examples 10-13 includes, wherein the second communication application is a telephone application on a mobile phone that provides telephone communication functionality, and the connection request is a phone call.

In Example 15, the subject matter of Examples 10-14 includes, wherein identifying the first communication application from a plurality of registered applications of a participant comprises providing connectivity data and context data of the participant as input to a machine learned model, the machine learned model previously trained using historical connectivity data of the participant, historical context data of the participant, and an identification of applications used by the participant for previous communication requests.

In Example 16, the subject matter of Examples 10-15 includes, wherein selecting the second communication application from the plurality of registered applications comprises providing connectivity data and context data of the participant as input to a machine learned model, the machine learned model previously trained using historical connectivity data of the participant, historical context data of the participant, and an identification of applications used by the participant for previous communication requests.

In Example 17, the subject matter of Examples 10-16 includes, wherein the connectivity data comprises an ordered ranking of application preferences of the participant and wherein identifying the first communication application comprises selecting a top ranking application and wherein selecting the second communication application comprises selecting a second ranking application.

In Example 18, the subject matter of Examples 10-17 includes, wherein identifying the first communication application from a plurality of registered applications of a participant comprises selecting the first communication application based upon connectivity data for the participant for joining the network-based communication session.

Example 19 is a computing device providing a communication service, the computing device comprising: at a pre specified time relative to a start time of a network-based communication session, automatically, at the computing device of the communication service hosting the network-based communication session: means for identifying a first communication application from a plurality of registered communication applications of a participant, the first communication application executing on a first computing device of the participant; means for determining a network address of the first computing device based upon a previously received packet received from the first computing device; means for sending a polling packet to the first communication application on the first computing device, the polling packet requesting a response packet and addressed to the network address of the first computing device; means for determining that no response packet has been received from the first communication application for the polling packet after a threshold amount of time has passed since sending the polling packet; responsive to determining that no response packet has been received: means for selecting a second communication application from the plurality of registered applications using connectivity data of the participant; means for causing a connection request to be sent to the second communication application; means for receiving a connection confirmation from the second communication application; and means for, responsive to receiving the connection confirmation, joining the second communication application with the network-based communication session by sending media packets of the network-based communication session to the second communication application.

In Example 20, the subject matter of Example 19 includes, wherein the means for identifying the first communication application from a plurality of registered applications of a participant comprises means for selecting the first communication application based upon connectivity data for the participant for joining the network-based communication session.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

What is claimed is:

1. A computing device providing a communication service, the computing device comprising:
   a processor;
   a memory, the memory storing instructions, which when executed by the processor, causes the computing device to perform operations comprising:
   at a pre-specified time relative to a start time of a network-based communication session, automatically, at the computing device of the communication service hosting the network-based communication session:
   identifying that a first communication application from a plurality of registered communication applications of a participant does not have connectivity to the communication service, the first communication application executing on a first computing device of the participant;
   responsive to determining that the first communication application does not have connectivity to the communication service:
   selecting a second communication application from the plurality of registered communication applications;
   causing a connection request to be sent to the second communication application;
   receiving a connection confirmation from the second communication application; and
   responsive to receiving the connection confirmation, joining the second communication application with the network-based communication session using communications messaging, once joined the communication service sending media packets of the network-based communication session to the second communication application, the second communication application executing on either the first computing device of the participant or a second computing device of the participant.

2. The computing device of claim 1, wherein the operations of identifying that the first communication application from the plurality of registered communication applications of the participant does not have connectivity to the communication service comprises identifying a threshold number of unsuccessful join attempts from the first communication application over a specified time period.

3. The computing device of claim 1, wherein the operations of identifying that the first communication application from the plurality of registered communication applications of the participant does not have connectivity to the communication service comprises failing to receive a response to a polling message sent at a time interval that is predetermined based on the start time of the network-based communication session.

4. The computing device of claim 1, wherein the first and second communication applications are selected based on a user preference data indicating a ranking of communication applications.

5. The computing device of claim 1, wherein the operations of selecting the second communication application from the plurality of registered communication applications comprises using connectivity data and context data of the participant to select the second communication application.

6. The computing device of claim 5, wherein the connectivity data comprises an ordered ranking of application preferences of the participant and wherein the operations of identifying the first communication application comprises selecting a top-ranking application and wherein the operations of selecting the second communication application comprises selecting a second ranking application.

7. The computing device of claim 1, wherein the first and second communication applications are on different computing devices.

8. A method for providing a communication service, the method comprising:
 at a pre-specified time relative to a start time of a network-based communication session, automatically, at a computing device of the communication service hosting the network-based communication session:
  identifying that a first communication application from a plurality of registered communication applications of a participant does not have connectivity to the communication service, the first communication application executing on a first computing device of the participant;
  responsive to determining that the first communication application does not have connectivity to the communication service:
   selecting a second communication application from the plurality of registered communication applications;
   causing a connection request to be sent to the second communication application;
   receiving a connection confirmation from the second communication application; and
   responsive to receiving the connection confirmation, joining the second communication application with the network-based communication session using communications messaging, once joined the communication service sending media packets of the network-based communication session to the second communication application, the second communication application executing on either the first computing device of the participant or a second computing device of the participant.

9. The method of claim 8, wherein identifying that the first communication application from the plurality of registered communication applications of the participant does not have connectivity to the communication service comprises identifying a threshold number of unsuccessful join attempts from the first communication application over a specified time period.

10. The method of claim 8, wherein the operations of identifying that the first communication application from the plurality of registered communication applications of the participant does not have connectivity to the communication service comprises failing to receive a response to a polling message sent at a time interval that is predetermined based on the start time of the network-based communication session.

11. The method of claim 8, wherein the first and second communication applications are selected based on a user preference data indicating a ranking of communication applications.

12. The method of claim 8, wherein selecting the second communication application from the plurality of registered communication applications comprises using connectivity data and context data of the participant to select the second communication application.

13. The method of claim 12, wherein the connectivity data comprises an ordered ranking of application preferences of the participant and wherein identifying the first communication application comprises selecting a top-ranking application and wherein selecting the second communication application comprises selecting a second ranking application.

14. The method of claim 8, wherein the first and second communication applications are on different computing devices.

15. A non-transitory machine-readable storage device, storing instructions for providing a communication service, the instructions, which when executed by a computing device of the communication service, cause the computing device to perform operations comprising:
 at a pre-specified time relative to a start time of a network-based communication session, automatically, at the computing device of the communication service hosting the network-based communication session:
  identifying that a first communication application from a plurality of registered communication applications of a participant does not have connectivity to the communication service, the first communication application executing on a first computing device of the participant;
  responsive to determining that the first communication application does not have connectivity to the communication service:
   selecting a second communication application from the plurality of registered communication applications;
   causing a connection request to be sent to the second communication application;
   receiving a connection confirmation from the second communication application; and responsive to receiving the connection confirmation, joining the second communication application with the network-based communication session using communications messaging, once joined the communication service sending media packets of the network-based communication session to the second communication application, the second communication application executing on either the first computing device of the participant or a second computing device of the participant.

16. The non-transitory machine-readable storage device of claim 15, wherein the operations of identifying that the first communication application from the plurality of registered communication applications of the participant does not have connectivity to the communication service comprises identifying a threshold number of unsuccessful join attempts from the first communication application over a specified time period.

17. The non-transitory machine-readable storage device of claim 15, wherein the operations of identifying that the first communication application from the plurality of registered communication applications of the participant does not have connectivity to the communication service comprises failing to receive a response to a polling message sent at a time interval that is predetermined based on the start time of the network-based communication session.

18. The non-transitory machine-readable storage device of claim 15, wherein the first and second communication applications are selected based on a user preference data indicating a ranking of communication applications.

19. The non-transitory machine-readable storage device of claim 15, wherein the operations of selecting the second communication application from the plurality of registered communication applications comprises using connectivity data and context data of the participant to select the second communication application.

20. The non-transitory machine-readable storage device of claim 19, wherein the connectivity data comprises an ordered ranking of application preferences of the participant and wherein the operations of identifying the first communication application comprises selecting a top-ranking application and wherein the operations of selecting the second communication application comprises selecting a second ranking application.

* * * * *